(12) United States Patent
Han et al.

(10) Patent No.: US 11,037,055 B2
(45) Date of Patent: Jun. 15, 2021

(54) SYSTEM FOR DYNAMIC ESTIMATED TIME OF ARRIVAL PREDICTIVE UPDATES

(71) Applicant: DoorDash, Inc., San Francisco, CA (US)

(72) Inventors: Jeff Ning Han, Palo Alto, CA (US); William Preston Parry, Akron, OH (US); Bing Wang, Palo Alto, CA (US); Rohan Balraj Chopra, San Francisco, CA (US)

(73) Assignee: DoorDash, Inc., San Francisco, CA (US)

( * ) Notice: Subject to any disclaimer, the term of this patent is extended or adjusted under 35 U.S.C. 154(b) by 710 days.

(21) Appl. No.: 15/798,207

(22) Filed: Oct. 30, 2017

(65) Prior Publication Data
US 2019/0130260 A1    May 2, 2019

(51) Int. Cl.
*G06N 3/08* (2006.01)
*G06Q 10/08* (2012.01)
(Continued)

(52) U.S. Cl.
CPC ............. *G06N 3/08* (2013.01); *G06F 16/487* (2019.01); *G06F 16/489* (2019.01);
(Continued)

(58) Field of Classification Search
CPC ........ G06N 3/08; G06N 20/00; G06N 3/0454; G06N 3/084; G06F 16/487; G06F 16/489;
(Continued)

(56) References Cited

U.S. PATENT DOCUMENTS 10,026,055 B2 *   7/2018   Riel-Dalpe ........ G06Q 10/0833
10,078,337 B1 *   9/2018   Yao ...................... G05D 1/0287
(Continued)

OTHER PUBLICATIONS

Jeremy Hermann and Mike Del Balso, Meet Michelangelo: Uber's Machine Learning Platform, (Sep. 5, 2017), Uber Engineering (Year: 2017).*

(Continued)

*Primary Examiner* — Shannon S Campbell
*Assistant Examiner* — Jessie James Shafer
(74) *Attorney, Agent, or Firm* — Kwan & Olynick LLP

(57) ABSTRACT

Described are systems and processes for generating dynamic estimated time of arrival predictive updates for delivery of perishable goods. In one aspect a system is configured for generating dynamic estimated time of arrival (ETA) predictive updates between a series of successive events for real-time delivery of orders. For each order, a plurality of delivery events and corresponding timestamps are received from devices operated by customers, restaurants, and couriers. Based on the timestamps, the system generates a plurality of ETA time predictions for one or more of the delivery events with trained predictive models that use weighted factors including historical restaurant data and historical courier performance. As additional timestamps are received for a delivery event, the trained predictive models dynamically update the ETA time predictions for successive events. The predictive models may be continuously trained by updating the weighted factors based on the received timestamps.

20 Claims, 11 Drawing Sheets

(51) Int. Cl.
*G06F 16/487* (2019.01)
*G06F 16/48* (2019.01)
*G06Q 50/12* (2012.01)

(52) U.S. Cl.
CPC ..... *G06Q 10/0833* (2013.01); *G06Q 10/0838* (2013.01); *G06Q 50/12* (2013.01)

(58) Field of Classification Search
CPC .......................... G06F 16/00; G06Q 10/0833; G06Q 10/0838; G06Q 50/12; G06Q 10/0832; G06Q 30/02; G06Q 330/0269; G06Q 30/0633; G06Q 50/10; H04L 65/00
USPC .......................................................... 705/338
See application file for complete search history.

(56) References Cited

U.S. PATENT DOCUMENTS

| | | | | |
|---|---|---|---|---|
| 10,262,281 | B1* | 4/2019 | Vitek | G06Q 10/063114 |
| 2002/0188492 | A1* | 12/2002 | Borton | G06Q 30/0202 |
| | | | | 705/7.13 |
| 2004/0204969 | A1* | 10/2004 | Wu | G06Q 10/08 |
| | | | | 705/6 |
| 2013/0246207 | A1* | 9/2013 | Novak | G06Q 30/0641 |
| | | | | 705/26.2 |
| 2015/0161554 | A1* | 6/2015 | Sweeney | G06Q 10/08355 |
| | | | | 705/7.15 |
| 2016/0048804 | A1* | 2/2016 | Paul | G06Q 10/08355 |
| | | | | 705/338 |
| 2017/0154348 | A1* | 6/2017 | Biswas | G06Q 30/0206 |
| 2018/0209808 | A1* | 7/2018 | Wang | G06K 9/6256 |
| 2018/0259345 | A1* | 9/2018 | Wang | G01C 21/26 |
| 2019/0107404 | A1* | 4/2019 | Zhong | G06F 16/29 |

OTHER PUBLICATIONS

Hermann et al., Meet Michelangelo: Uber's Machine Learning Platform, Sep. 5, 2017 (Year: 2017).*

Li et al., Scaling Machine Learning as a Service, 2016, JMLR: Workshop and Conference Proceedings 67:15-29 (Year: 2016).*

"Technological Disruption and Innovation in Last-Mile Delivery," gsb.stanford.edu/r/vcii, Jun. 2016, 26 pages.

Rick Fulton, "Estimating Delivery Times: A Case Study in Practical Machine Learning," Oct. 23, 2015, printed from website https://blog.postmates.com/estimating-delivery-times-a-case-study-in-practical-machine-learning-e70f677e736c, 11 pages.

Raman, Venki and Reddy, Sunil, "Predicting Delivery Time of Components in a Supply Chain", Technical Disclosure Commons, (Dec. 7, 2017), printed from http://www.tdcommons.org/dpubs_series/887, 34 pages.

Dong Wang, "When Will You Arrive? Estimating Travel Time Based on Deep Neural Networks," 2018, Association for Advancement of Artificial Intellilgence (www.aaai.org), 8 pages.

* cited by examiner

SYSTEM FOR DYNAMIC ESTIMATED TIME OF ARRIVAL PREDICTIVE UPDATES

TECHNICAL FIELD

The present disclosure relates to a system for facilitating a real-time, on-demand deliveries of perishable goods. In one example, the present disclosure relates to mechanisms and processes for tracking and determining the arrival status of a delivery.

BACKGROUND

Logistics platforms, particularly logistics platforms for managing real-time on-demand deliveries of perishable goods, rely on accurate location and status information to effectively and efficiently connect consumers with providers. Unfortunately, conventional mechanisms for determining location and status are at best noisy and at worst wrong.

Consequently, it is desirable to provide improved mechanisms for determining location and status, particularly with respect to logistics platforms for managing real-time on-demand deliveries of perishable goods.

SUMMARY

Provided are various mechanisms and processes relating to tracking and determining the arrival status of a delivery. In one aspect, which may include at least a portion of the subject matter of any of the preceding and/or following examples and aspects, a server is provided comprising an interface configured to receive a plurality of events including a plurality of timestamps at a server configured to generate dynamic estimated time of arrival (ETA) predictive updates for real-time delivery of perishable goods.

The plurality of events include: a first event and a first timestamp corresponding to placement of the order at the restaurant by a customer; a second event and a second timestamp corresponding to confirmation of receipt of the order by the restaurant; a third event and a third timestamp corresponding to confirmation of completion of the order by the restaurant; a fourth event and a fourth timestamp corresponding to pickup of the order by a courier; and a fifth event and a fifth timestamp corresponding to completion of delivery of perishable goods to the customer. Various events in the plurality of events are received from one or more of the following: the courier, the restaurant, and the customer.

The server may further comprise memory configured to store the plurality of events for the order and other orders, and a processor configured to dynamically generate a plurality of ETA time durations between each of the plurality of events. The plurality of ETA time durations is generated based on a plurality of weighted factors including historical restaurant data and historical courier performance.

The processor may be associated with a neural network. The processor may dynamically generate the plurality of ETA time durations by continuously training a model using the plurality of weighted factors.

The plurality of weighted factors may further include data on the dishes in the order by the customer, time, date, and weather, and a sub-total of the order and the number of orders at the restaurant.

The plurality of ETA time durations may be used to predict ETAs for completion of the order by the restaurant, pickup of the order by the courier, and completion of delivery of perishable goods to the customer. The predicted ETAs may be provided to the customer and used to route couriers and assign multiple deliveries to the same courier. The predicted ETAs are provided to the customer and used to offer subsequent delivery opportunities to the courier. The plurality of ETA time durations may be provided to an assignment algorithm used to pair couriers with a plurality of received orders. The plurality of ETA time durations are provided to escalate issues and determine which part of a delivery went wrong by comparing predicted and actual event timestamps.

Other implementations of this disclosure include corresponding devices, systems, and computer programs, as well as and associated methods for dynamically updating predictive ETAs for deliveries. These other implementations may each optionally include one or more of the following features. For instance, provided is a programmable device configured for generating dynamic estimated time of arrival (ETA) predictive updates between a series of successive events in a data set using a neural network. The programmable device is configured to operate in a training mode and an inference mode.

In the training mode, the programmable device is configured to pass a dataset into the neural network. The data set may include a series of successive events with corresponding known time durations between events. In the training mode, the programmable device is further configured to train the neural network to accurately and dynamically output ETA predictive updates. Training the neural network may include inputting different combinations of events and time durations, and comparing actual time of arrivals (ATAs) with generated ETA predictions to allow for the neural network to automatically and iteratively adjust weighted factors in the neural network.

In the inference mode, the programmable device is configured to pass a first event into the neural network. The first event may include a first timestamp. A first ETA prediction may then be automatically generated based on trained weighted factors.

In the inference mode, the programmable device is further configured to pass a second event into the neural network. The second event may include an updated timestamp. The first ETA prediction may then be automatically adjusted to form a second updated ETA prediction.

A first training event of the data set may include a placement of the order at a merchant by a customer. A second training event of the data set may include a confirmation of receipt of the order by the merchant. A third training event of the data set may include a confirmation of completion of the order by the merchant. A fourth training event of the data set may include a pickup of the order by a courier. A fifth training event of the data set may include a completion of delivery of the order to the customer.

The weighted factors may include a combination of one or more of the following: time, date, weather, number of dishes in a restaurant order, sub-total of a restaurant order, historical restaurant data, historical courier performance, and size of markets.

The neural network may comprise a plurality of sub-networks, wherein each sub-network corresponds to a time duration between the successive events. A first sub-network may correspond to a time duration between the first event and the second event, and a second sub-network may correspond to a time duration between the second event and a third event. In an embodiment, the output of the first sub-network is input into the second sub-network. In other embodiments, the output of each sub-network is aggregated to adjust an ETA prediction to form the second updated ETA prediction.

The second timestamp comprises a first ATA, wherein the first ATA is input into the first sub-network to automatically and iteratively adjust weighted factors in the first sub-network.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments of the present disclosure.

DETAILED DESCRIPTION OF PARTICULAR EMBODIMENTS

Figure 1:
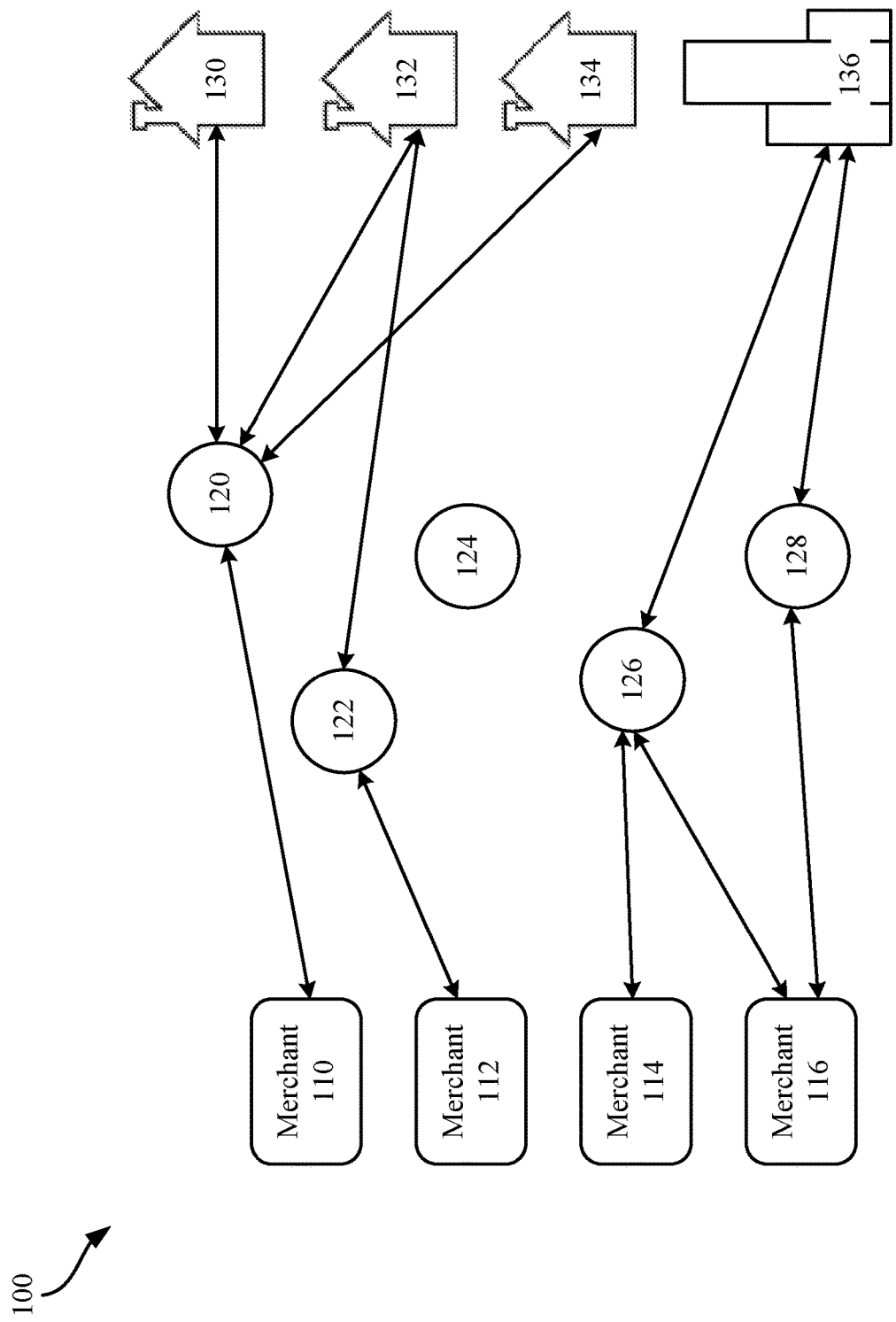
FIG. 1 illustrates one example of a delivery logistics system having multiple merchants, couriers, and customers, in accordance with one or more embodiments.

Reference will now be made in detail to some specific examples of the disclosure including the best modes contemplated by the inventors for carrying out the disclosure. Examples of these specific embodiments are illustrated in the accompanying drawings. While the present disclosure is described in conjunction with these specific embodiments, it will be understood that it is not intended to limit the disclosure to the described embodiments. On the contrary, it is intended to cover alternatives, modifications, and equivalents as may be included within the spirit and scope of the disclosure as defined by the appended claims.

In the following description, numerous specific details are set forth in order to provide a thorough understanding of the present disclosure. Particular embodiments of the present disclosure may be implemented without some or all of these specific details. In other instances, well known process operations have not been described in detail in order not to unnecessarily obscure the present disclosure.

For example, the techniques of the present invention will be described in the context of particular protocols, such as Wi-Fi or Bluetooth. However, it should be noted that the techniques of the present invention may also be applied to variations of protocols. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

With regard to the present disclosure, logistics platforms managing real-time on-demand deliveries of perishable goods rely on accurate location and status information to allow for effective and efficient delivery experiences between providers and customers. In particular, customers want to know when to expect particular orders to arrive, providers want to know when a delivery associate is arriving, and oversight requires knowing how to efficiently route delivery associates based on real-time location and status information. However, existing location information services have significant drawbacks. As used herein, the term "provider" may be used to describe various types of merchants that provide goods, including perishable goods, and the terms "provider" and "merchant" may be used interchangeably. As used herein, the term "delivery associate" may be used to describe a driver or courier that is delivers the goods provided by the merchant to a customer, and the terms "delivery associate" and "courier" may be used interchangeably.

Current systems for determining delivery completion do not accurately predict delivery status because they are less rigorous in terms of definitions on the various events that occur during a delivery. For example, existing systems may simply compute the time duration between order creation and order drop off to the customer. While this approach may be helpful in determining how long a delivery will take, it does not provide intermediary timestamps required for more optimal delivery assignment.

Other existing systems may utilize location data to estimate average travel time for couriers. One location information service commonly used by various individuals, businesses, drivers, etc. is Global Positioning System (GPS). However, GPS has numerous drawbacks, such as significant noise and many false positives. In some implementations, GPS has been used with geofencing such that when a delivery associate has arrived within a perimeter of a restaurant or grocery store, it is determined that the delivery associate has arrived. However, one problem is that GPS signals may drift so that the delivery associate appears to be within the perimeter of the geofence even when they are not. Accordingly, GPS may sometimes misreport the location of a delivery associate, thereby reducing the accuracy and efficiency of a logistics platform.

Overview

Accordingly, the present disclosure describes various examples of delivery tracking systems and processes that provide ways of more accurately determining when a delivery associate will arrive at a destination, such as a merchant location or customer location, and updating the estimated time of arrival (ETA) in real-time. In some examples, a delivery tracking system generates ETA predictions using a neural network that implements weighted factors. In some embodiments, real-time status updates of events corresponding to a delivery may be provided as input into the neural network to refine ETA computations. Furthermore, various parameters may receive in real-time and input as weighted factors to continually update the ETA. In some embodiments, the neural network may iteratively update various computational layers based on the real-time status updates of events. In some embodiments, the improved delivery tracking system may generate ETA predictions of the various events that occur during a delivery from order placement to delivery completion.

In some embodiments, real-time status updates may be transmitted manually by a delivery associate upon completing a task or event. In some embodiments, real-time status updates may be determined via proximity using various location services, such as GPS. In some embodiments, real-time status updates may be determined by one or more proximity sensors located at various locations, such as a provider location, a courier vehicle, or devices corresponding to the provider or courier. The system may determine when a delivery associate has arrived at a provider site when a vehicle associated with the delivery associate has been detected in proximity to a provider site that is preparing an order for a current delivery, and the delivery associate has left the vehicle. By detecting that the delivery associate has left the vehicle in proximity to the provider site, the system can more accurately determine when the delivery associate has actually arrived. Additionally, in some examples, the system determines the location of the delivery associate and/or a vehicle associated with the delivery associate by using triangulation.

In some embodiments, the systems described herein may be structured for the use case of on-demand delivery of perishable goods originating from a third-party merchant which require specific points of acknowledgement. In addition to providing dynamically updated ETA predictions for a delivery to a customer, such improved system for dynamic tracking of deliveries may provide data for various other related systems. For example, accurate ETA predictions may be used to provide guidance to a delivery routing system to efficiently route couriers to and from merchant locations by generating ETA predictions for specific events. This may reduce costs on a per delivery basis.

EXAMPLE EMBODIMENTS

With reference to FIG. 1, shown is an example of a delivery logistics system 100 having multiple merchants, couriers, and customers, in accordance with one or more embodiments. As used herein, the term "delivery logistics system" may be used interchangeably with the terms "logistics platform" or "delivery platform." In the present example, the delivery service logistics system 100 is a logistics platform managing provides real-time, on-demand, delivery of perishable goods. For instance, a customer may order food from a restaurant by using a mobile device application that places the order through the logistics platform. In some instances, the user may also access the logistics platform through the internet via a computer, laptop, tablet, etc. When the customer orders the food through the logistics platform, the order is prepared at a provider site, where a delivery associate will then pick up the order and delivery the order from the provider site to the customer.

As shown in FIG. 1, system 100 includes providers 100, 112, 114, and 116. According to various examples, a provider may be a merchant that prepares perishable goods such as food at a restaurant. Other such merchants may be any combination of one or more of the following: restaurants, bars, cafes, or other vendor of food or beverages, such as a hotel. Such venues may also be referred to herein as HORECA (Hotel/Restaurant/Café) which is a term or abbreviation used to describe entities in the food service industry.

However, in some examples, provider sites may also provide other perishable goods such as floral arrangements, medications, refrigerated or frozen items, live animals, etc. that may need real-time, on-demand delivery to a customer. Accordingly, although various examples in the present disclosure may describe the provider sites and logistics platform in the context of restaurants and food delivery, the mechanisms and processes described herein may also be applied to the delivery of various other perishable items. As used herein, the terms "provider" and "merchant" may be used interchangeably.

System 100 also includes one or more couriers 120, 122, 124, 126, and 128. Such couriers may be on foot, or traveling by vehicle, such as a car, scooter, bicycle, etc. In various embodiments of system 100, one or more couriers may be directed to one or more merchants to receive an order placed by customers and deliver the orders to the customers located at corresponding destinations 130, 132, 134, or 136, which may be residential or commercial addresses. In some embodiments, the destinations may correspond to a particular geo-location determined by GPS or other coordinate system.

In various embodiments, the logistics platform may determine the estimated time arrival (ETA) of delivery of the order to the customer once the order has been placed. This ETA may be provided to the customer. The ETA of delivery of an order may be estimated based on tracked events or milestones corresponding to the order. As used herein, the terms "events" may be used interchangeably with "milestones." The customer may also be provided with information regarding the status of the order, events, or milestones. The customer may also be provided with other information, such as information corresponding to the courier, etc. Information regarding the status of the order, events, or milestones may also be provided to the merchants and the couriers.

Figure 2:
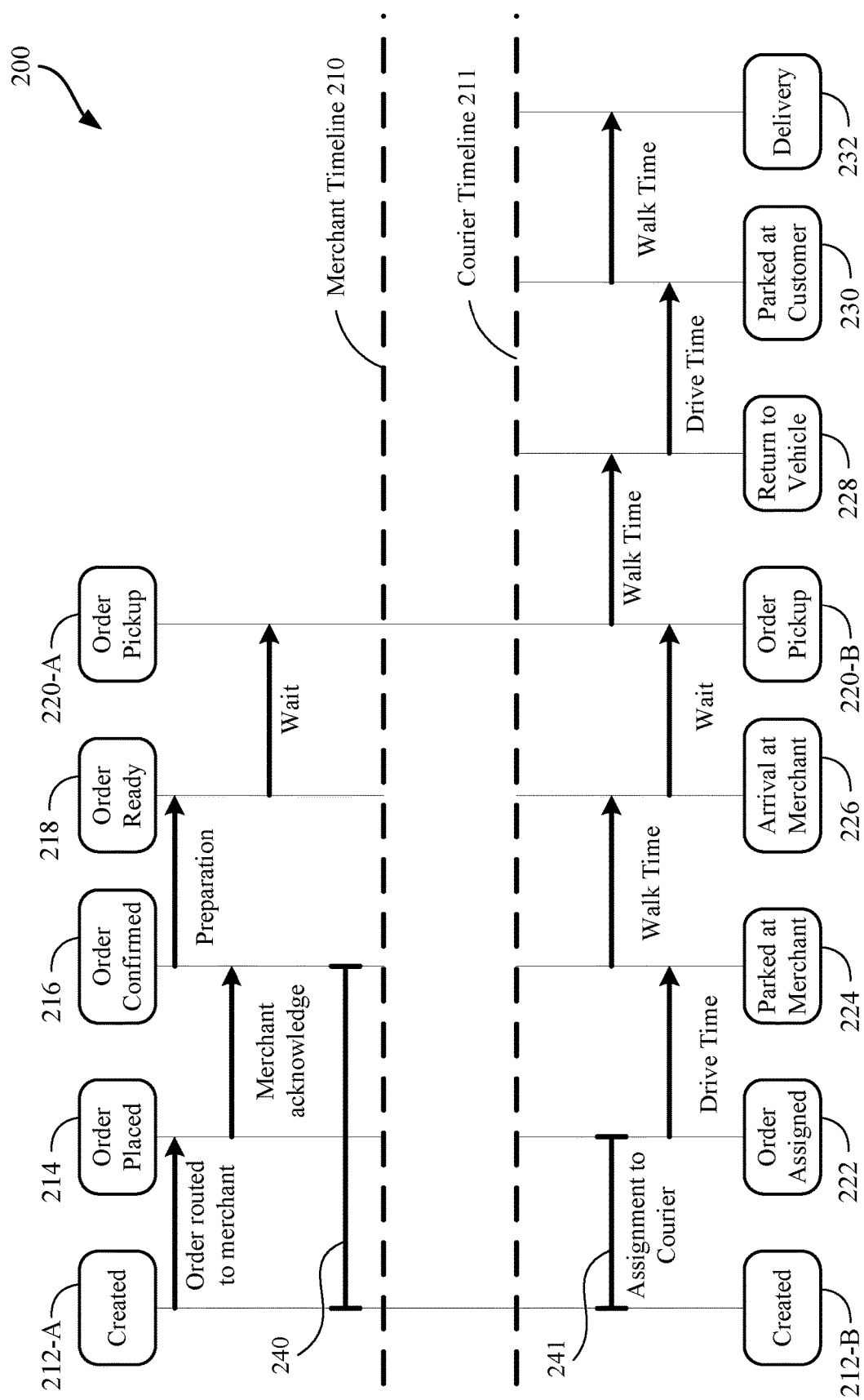
FIG. 2 illustrates an example timeline of delivery events associated with real-time on-demand delivery of perishable goods, in accordance with one or more embodiments.

With reference to FIG. 2, shown is an example timeline 200 of delivery events associated with real-time on-demand delivery of perishable goods, in accordance with one or more embodiments. Timeline 200 depicts the various events that occur when an order is placed by a customer on a merchant timeline 210 and a courier timeline 211. In various embodiments, a merchant timeline or courier timeline may include additional or fewer events than depicted in FIG. 2. In various embodiments, the events in timeline 200 may be tracked via transmission between a server system and a client devices associated with one or more couriers, merchants, and/or customers, which may be further described with reference to FIG. 3. As used herein, client devices associated with customers may be referred to as "customer devices," client devices associated merchants may be referred to as "merchant devices," and client devices associated with couriers may be referred to as "courier devices." The server system may implement a dynamic ETA estimation system as further described herein.

The events that occur on a merchant timeline 210 may include order creation 212-A, order placement 214, order confirmation 216, order ready 218, and order pickup 220-A. An order creation 212-A may occur when the system receives an order created by a customer. The order may be received at the server system. The order may then be routed to the designated merchant. In some embodiments, the order is routed to the designated merchant by transmitting information corresponding to the order from the server to a merchant device.

The order placement 214 event may occur when the order is received at the merchant device. In some embodiments, the merchant may acknowledge the receipt of the order by transmitting a confirmation, which may trigger the order confirmation 216 event. Order confirmation 216 may signal that preparation of the order has begun by the merchant. In some embodiments, the period of time between order creation 212-A and order confirmation 216 is known as kitchen latency 240.

An order ready 218 event may then occur when preparation of the items in the order is completed and the order is ready for pickup by a courier. Event 218 may be triggered by a merchant confirmation that the order is ready. Such confirmation may be transmitted by the merchant device to the server. The merchant may then wait for a courier to arrive for pickup of the order. When a courier arrives and picks up the order, the order pickup 220-A event occurs. This event may also be triggered by a merchant confirmation that the courier has received the order.

In some embodiments, the events that occur on a courier timeline 211 may overlap or correspond with one or more events on a merchant timeline 210. The events on courier timeline 211 may include order creation 212-B, order assignment 222, parked at merchant 224, arrival at merchant 226, order pickup 220-B, return to vehicle 228, parked at customer 230, and order delivered 232.

In some embodiments, order creation 212-B may correspond to order creation 212-A, and may occur when the system receives an order created by a customer as in event 212-A. In some embodiments, event 212-A and 212-B may be the same event. The system may then assign the order to a courier, thereby triggering order assignment 222. In some embodiments, order assignment 222 may be triggered by confirmation of acceptance of the order by the courier. The system may transmit a notification to a courier device corresponding to the courier. In some embodiments, the period of time between order creation 212-B and order assignment 222 may be known as assignment latency 241.

When order assignment 222 occurs may depend on various factors, including the distance of the courier from the merchant, the travel time of the courier to the merchant, traffic, time of day, etc. In some embodiments, order assignment 222 may not occur until the order has been confirmed by the merchant at 216 or is being prepared by the merchant. In some embodiments, order assignment 222 may not occur until the merchant has confirmed that the order is ready for pickup at 218. As used herein, an order assignment or delivery assignment may refer to the pairing of an order with a courier and providing the courier with a delivery opportunity to deliver the order to the corresponding delivery destination, which may be accepted or declined by the courier.

Once an order is assigned at 222, the courier may travel to the merchant location to pick up the order. The courier may then pick up the order upon arrival at the merchant location, and trigger order pickup 220-B. Event 220-B may correspond to order pickup 220-A. In some embodiments, event 220-A and 220-B may be the same event. In some embodiments, event 220-B may be triggered by a courier confirmation that the courier has received the order from the merchant.

In some embodiments, the system may attempt to assign orders and route couriers such that the arrival at merchant 226 coincides with order ready 218. This may optimize the actions of the courier and the merchant to minimize down time, which may occur where courier arrives before the merchant has completed the order, or where the merchant has completed the order before the courier arrives.

In some embodiments, additional events may be tracked between the order assignment 222 and the arrival at merchant 226. For example, the courier may travel to the merchant location by vehicle and then park her vehicle in an appropriate location to reach the merchant. In some embodiments, the courier may confirm that the vehicle is parked by transmitting the confirmation from the courier device to the server, thereby triggering parked at merchant 224. The courier may then have to walk or otherwise travel from the parking location to the merchant. An arrival at merchant event 226 may also occur when the courier has arrived at the merchant location. A confirmation of the courier's arrival may be sent by the courier device and/or the merchant device. In various embodiments, tracking these additional events may provide more accuracy of ETA predictions between order assignment 222 and arrival at merchant 226.

In some embodiments, the courier may have to wait for the order to be completed. After order pickup 220-B, the courier may then travel to the customer location to complete delivery of the order at order delivery 232. Order delivery 232 may occur when the order has been given to the customer. Order delivery 232 may be triggered by confirmation of the delivery by the customer or the courier via corresponding devices.

In some embodiments, additional events may be tracked between the order pickup 220-B and the order delivery 232. For example, the courier may confirm the return to a vehicle after order pickup 220-B at the merchant location. This may be done via confirmation transmitted from the courier device to the server. In some embodiments, confirmation may be manually input or automatically detected via a proximity beacon. For example, the systems used to determine the location of a courier may implement Bluetooth Low Energy (BLE) beacons and BLE-enabled devices that are capable of detecting signals emitted by the BLE beacons.

By using BLE beacons and devices, the system can provide more accurate location information of a delivery associate and can avoid the drawbacks of GPS, cell tower triangulation, and manual location entry. Specifically, the system can be used when there are weak or nonexistent GPS or cell signals. The system also detects location automatically without requiring any input from a delivery associate. As described in examples of various mechanisms and processes herein, the use of BLE beacons and BLE-enabled devices to provide location services yields increased efficiency and accuracy, in addition to other benefits, for a logistics platform managing real-time, on-demand, deliveries of perishable goods.

As another example, the courier may then park her vehicle in an appropriate location to reach the customer. In some embodiments, the courier may confirm that the vehicle is parked by transmitting the confirmation from the courier device to the server, thereby triggering parked at customer event 230, similar to the parked at merchant event 224. The courier may then have to walk or otherwise travel from the parking location to the customer location. An arrival at customer event (not shown) may also occur when the courier has arrived at the customer location before delivery of the order.

In various embodiments, the tracking of events or milestones may provide guidance to an assignment or routing algorithm to efficiently route couriers. For example, by generating ETA predictions for various events, as described above, may allow for more optimal assignment of deliveries to couriers for on-demand delivery of perishable goods originating from third party merchants which require specific points of acknowledgement.

Figure 3:
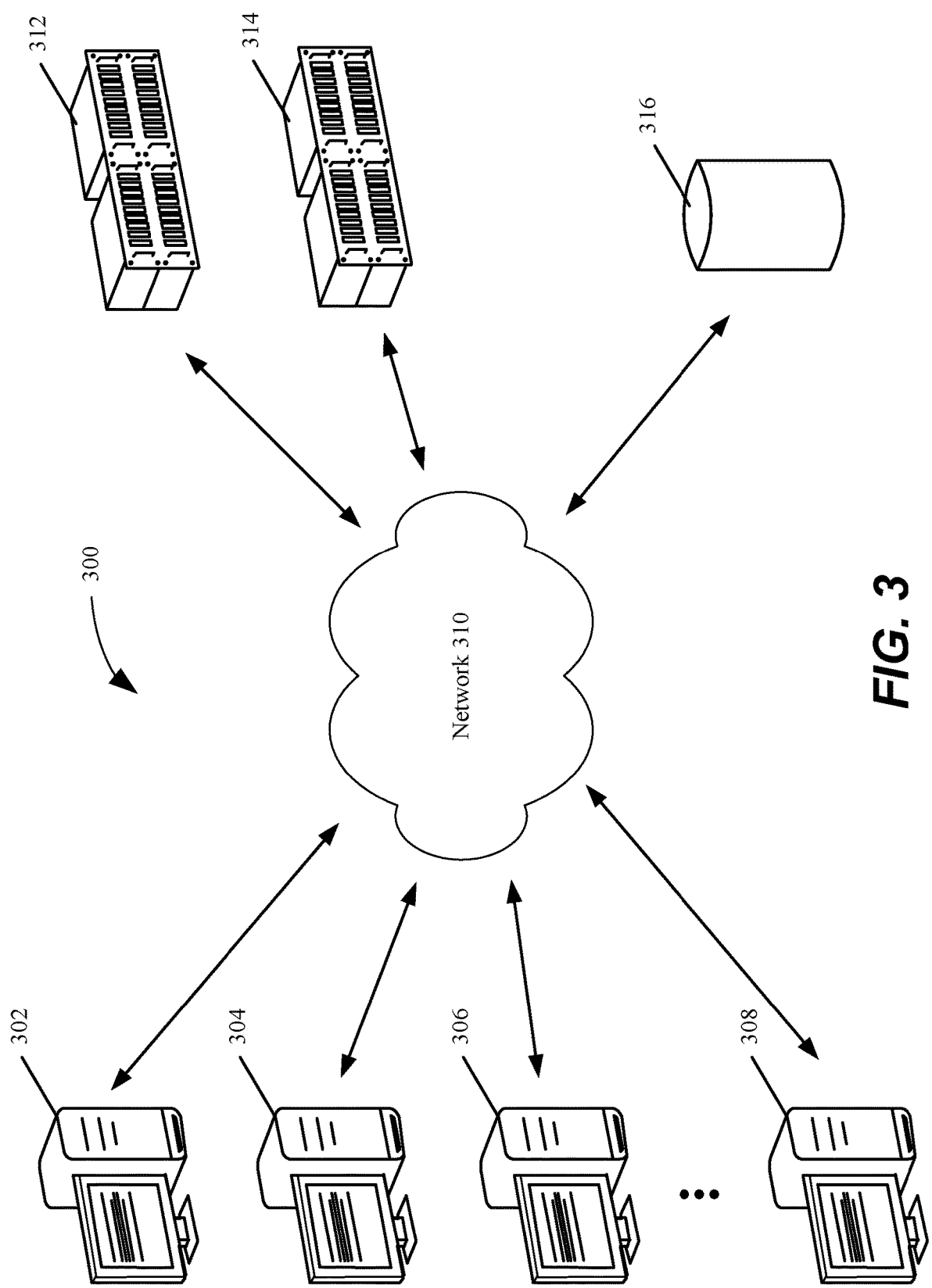
FIG. 3 illustrates a diagram of an example network architecture for implementing various systems and methods of the present disclosure, in accordance with one or more embodiments.

In various embodiments, one or more of the events described herein may be transmitted to a client devices corresponding to customers, merchants, or couriers. FIG. 3 illustrates a diagram of an example network architecture 300 for implementing various systems and methods of the present disclosure, in accordance with one or more embodiments. The network architecture 300 includes a number of client devices 302-308 communicably connected to one or more server systems 312 and 314 by a network 310. In some embodiments, server systems 312 and 314 include one or more processors and memory. The processors of server systems 312 and 314 execute computer instructions (e.g., network computer program code) stored in the memory to perform functions of a network data exchange server. In various embodiments, the functions of the network data exchange server may include routing real-time, on-demand, delivery of perishable goods, and/or predicting and dynamically updating estimated time of arrivals (ETAs) for such deliveries.

In some embodiments, server system 312 is a content server configured to receive and store network profile information. In some embodiments server system 314 is a dispatch server configured to transmit and/or route network data packets including network messages. In some embodiments, content server 310 and dispatch server 312 are configured as a single server system that is configured to perform the operations of both servers.

In some embodiments, the network architecture 300 may further include a database 316 communicably connected to client devices 302-308 and server systems 312 and 314 via network 310. In some embodiments, network data, or other information such as user information, courier information, and merchant information, may be stored in and/or retrieved from database 316.

Users of the client devices 302-308 access the server system 312 to participate in a network data exchange service. For example, the client devices 302-308 can execute web browser applications that can be used to access the network data exchange service. In another example, the client devices 302-308 can execute software applications that are specific to the network (e.g., networking data exchange "apps" running on smartphones).

Users interacting with the client devices 302-308 can participate in the network data exchange service provided by the server system 312 by distributing digital content, such as text comments (e.g., updates, announcements, replies), digital photos, videos, online orders, payment information, activity updates, location information, or other appropriate electronic information. In some implementations, information can be posted on a user's behalf by systems and/or services external to the network or the server system 312.

For example, the user may post a review of a movie to a movie review website, and with proper permissions that website may cross-post the review to the network on the user's behalf. In another example, a software application executed on a mobile device, with proper permissions, may use global positioning system (GPS) capabilities to determine the user's location and automatically update the network with his location (e.g., "At Home", "At Work", "In San Francisco, Calif.").

In some implementations, the client devices 302-308 can be computing devices such as laptop or desktop computers, smartphones, personal digital assistants, portable media players, tablet computers, or other appropriate computing devices that can be used to communicate with an electronic social network. In some implementations, the server system 312 can include one or more computing devices such as a computer server. In various embodiments, each of client devices 302-308 may be any one of merchant devices corresponding to merchants 110-116, courier devices corresponding to couriers 120-128, or customer devices corresponding to customers 130-136.

In some implementations, the server system 312 can represent more than one computing device working together to perform the actions of a server computer (e.g., cloud computing). In some implementations, the network 310 can be a public communication network (e.g., the Internet, cellular data network, dial up modems over a telephone network) or a private communications network (e.g., private LAN, leased lines).

Figure 4A:
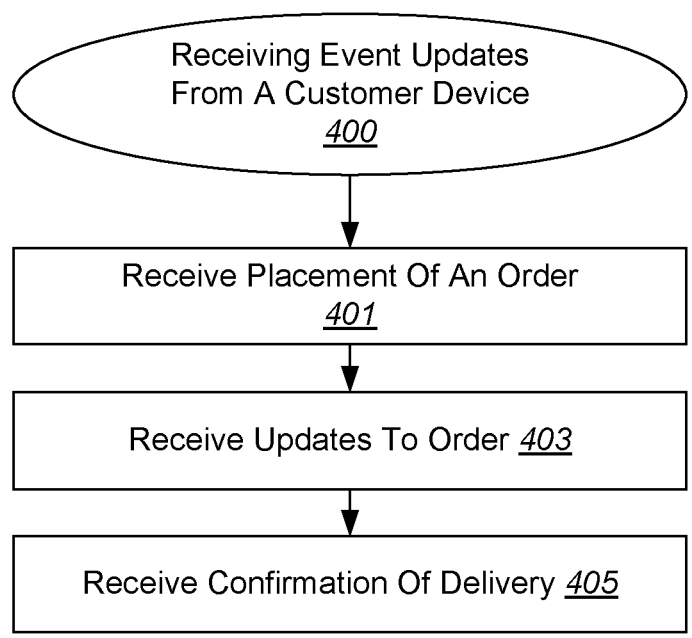
FIGS. 4A, 4B, and 4C illustrate example processes for processing of various events and timestamps using weight factors, in accordance with one or more embodiments.
Figure 4B:
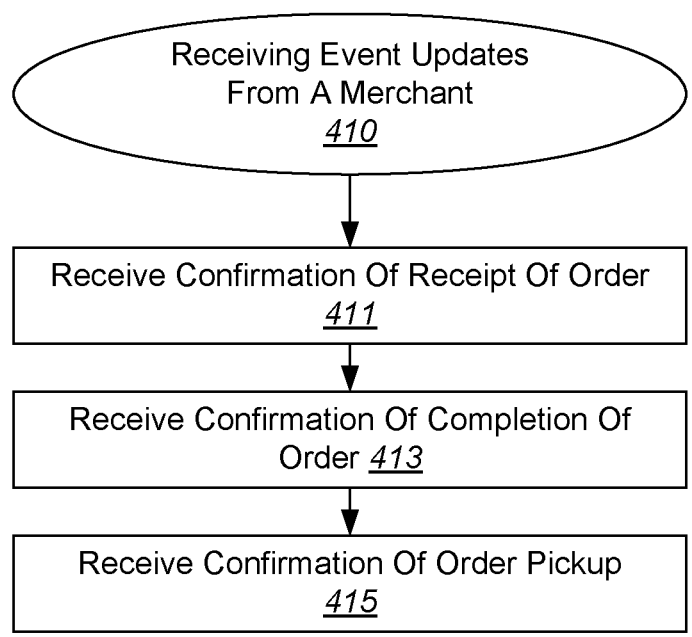
Figure 4C:
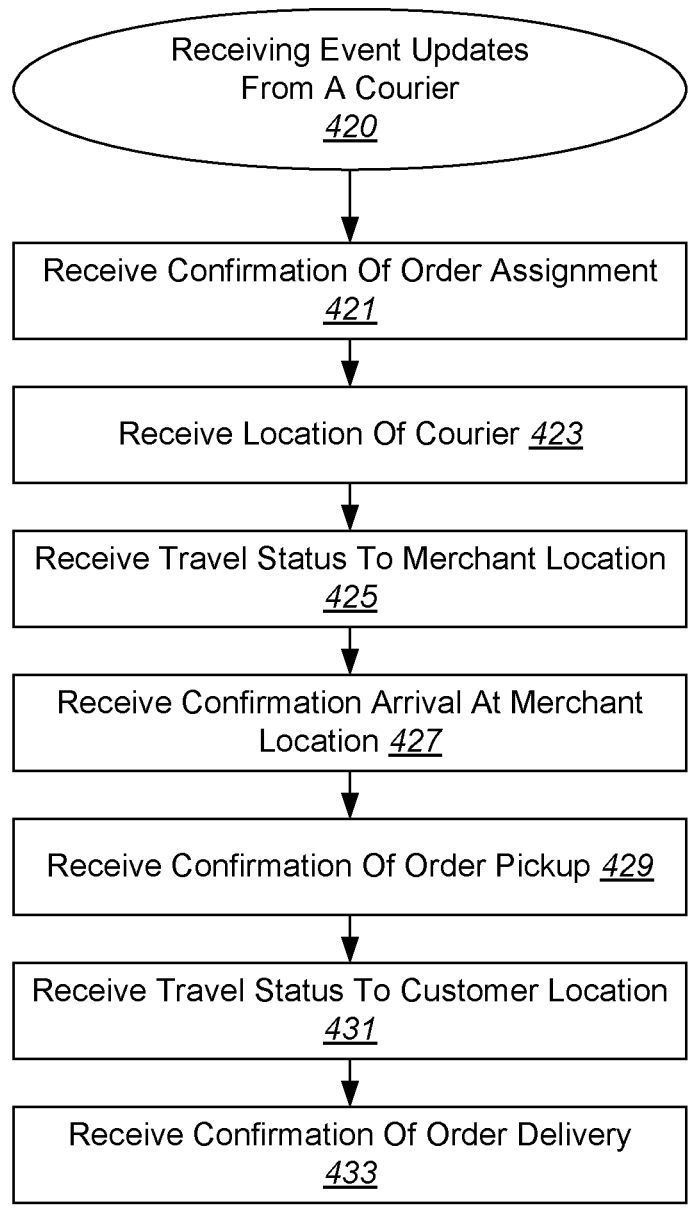

Various customers, merchants, and couriers may transmit information related to one or more orders to the servers 312 or 314 via corresponding client devices. As previously described, such information may include order information, payment information, activity updates, timestamps, location information, or other appropriate electronic information. The system may then utilize this information to calculate the ETA of the delivery of the order, as well as dynamically updating the ETA when updated timestamps are received. With reference to FIGS. 4A-4C, shown are example methods for receiving multiple events and timestamps, in accordance with one or more embodiments.

FIG. 4A depicts an example flow chart of an example process 400 for receiving event updates from a customer device. At 401, a placement of an order is received. In some embodiments, an order may be placed by a customer on a corresponding customer device, such as 302-308. In some embodiments, the order may be places in a web browser or an application installed in the customer device. The order information may be transmitted via network 310. The order placement may include location information corresponding to the location for delivery of the order. For example, the location of the customer device may be determined via GPS. As another example, the location information may include an address corresponding to the customer. Order placement may further include additional information, such as ordered items, payment information, and other customer information. In some embodiments, the receipt of an order at 401 may correspond to the order creation event 212-A and/or 212-B.

In some embodiments, updates to the order may be received at 403. In some embodiments, order updates may include addition or removal of various items in the order, cancellation of the order, changes in delivery location, etc. In some embodiments, updates to the order may be factored into the predicted ETA of order delivery. In some embodiments, a confirmation of delivery may be received from the customer device at 405. For example, the customer may transmit a confirmation of delivery via the customer device once the order is received from the courier. However, in some embodiments, confirmation of delivery may be transmitted by the courier via a corresponding courier device, as further described with reference to FIG. 4C. In some embodiments, receiving updates to the order may be an optional implementation.

FIG. 4B depicts an example flow chart of an example process 410 for receiving event updates from a merchant device. A confirmation of receipt of order may be received at 411. In some embodiments, an order may be routed over network 310 by the system to the merchant device associated with the appropriate merchant. The merchant may then transmit a confirmation of receipt of the order, which may trigger the order confirmation event 216. In some embodiments, the confirmation of receipt order at 411 may be automatically transmitted via network 310 to the system 312 once the order has been successfully routed to and received by the merchant device.

Once the merchant has completed the preparation of the order, a confirmation of completion of order may be received at 413. The confirmation of completion of order may trigger the order ready event 218. A confirmation of order pickup may then be received at 415 and trigger the order pickup event 220-A. The merchant may transmit the order pickup confirmation via the merchant device once the courier has picked up the order. However, in some embodiments, confirmation of order pickup may be transmitted by the courier via a corresponding courier device, as further described with reference to FIG. 4C.

FIG. 4C depicts an example flow chart of an example process 420 for receiving event updates from a courier device. At 421, a confirmation of order assignment may be received. In some embodiments, the confirmation of order assignment may be an acceptance of the order assignment input by the courier on the courier device. At 423, the location of the courier may be received. In some embodiments, the location of the courier may be tracked and updated in real time. In some embodiments, the location of the courier may be tracked via the courier device, such as by using real-time GPS coordinates. In some embodiments, the location of the courier may be additionally tracked using proximity beacons.

In various embodiments, the courier may travel to the merchant location after order assignment 222. As the courier travels to the merchant location, the travel status to the merchant location may be received at 425. In various embodiments, the travel status may include the status of the vehicle corresponding to the courier. For example, the courier device may transmit a notification to the server system that the courier has parked his vehicle near the merchant location. This may correspond to the parked at merchant event 224.

Upon the courier's arrival at the merchant location, a confirmation of arrival at merchant location may be received at 427. In some embodiments, the confirmation of arrival at merchant location may be a check-in status update input by the courier on the courier device and transmitted via network 310. Once the order is provided to the courier, a confirmation of order pickup may be received at 429. In some embodiments, the confirmation of order pickup may be confirmed by the courier via the courier device. As previously described, the confirmation of order pickup may additionally, and/or alternatively, be confirmed by the merchant via the merchant device.

In various embodiments, the courier may travel to the customer location after order pickup 220-B. As the courier travels to the customer location, the travel status to the customer location may be received at 431. In various embodiments, the travel status may include the status of the vehicle corresponding to the courier. For example, the courier device may transmit a notification to the server system that the courier has returned to the vehicle after the order pickup. This may correspond to the return to vehicle event 228. As another example, the courier device may transmit a notification to the server system that the courier has parked his vehicle near the customer location. This may correspond to the parked at customer event 230.

Next, a confirmation of order delivery may be received at 433 from the courier device. In some embodiments, the confirmation of order delivery may be confirmed by the courier via the courier device. As previously described, the confirmation of order delivery may additionally, and/or alternatively, be confirmed by the customer via the customer device.

In some embodiments, processes 400, 410, and 420 may be integrated within a single process. In some embodiments, the described system may receive additional or fewer event updates than depicted in FIGS. 4A-4C.

In some embodiments, the travel status of the courier at various points in timeline 200 may be tracked via a proximity system, which includes one or more beacons. Various systems and processes for determining the location of a courier using proximity sensors and/or beacons are described in U.S. patent application Ser. No. 15/826,737 titled IMPROVING PREDICTIONS BY USING BEACONS IN A REAL-TIME LAST MILE LOGISTICS PLATFORM by Hsieh et al., filed on Nov. 30, 2017, which application is incorporated by reference herein in its entirety and for all purposes.

For example, BLE beacon sensors may be placed in the courier's vehicle, which may be configured to detect a beacon device corresponding to the courier location. In some embodiments, the beacon device may be a client device associated with the courier. Additionally, beacon sensors may be located at one or more merchant locations. In some embodiments, the courier device may include the beacon sensor and beacon devices may be located at the courier's vehicle or various merchant locations. As the courier, and the corresponding courier device, travels toward and away from various beacons, the location real-time location of the courier may be tracked.

For example, if it is detected that the distance between the courier and the courier's vehicle increases after order assignment 222, but before order pickup 220-B, then it may be determined that the courier has parked the vehicle and is moving toward the merchant location. As another example, the courier may be determined to be walking toward the merchant location via proximity sensors located at one or more nearby merchant locations, as well as the target merchant location, which are configured to detect the beacon device corresponding to the courier's location. Arrival at merchant 226 may also be determined when the courier device is brought within a predetermined radius of a beacon sensor at the merchant location.

The travel status of the courier may also be tracked after order pickup 220-B and before order delivery 232. If it is detected that the distance between the courier and the merchant location increases, then it may be determined that the courier is leaving the merchant location and traveling toward the vehicle. As another example, once the courier moves within a predetermined radius of the vehicle, the proximity sensors may determine that the return to vehicle event 228 has occurred, and an additional travel status to customer location may be received at 431. Subsequently, if it is detected that the distance between the courier and the courier's vehicle increases, then it may be determined that the courier has parked the vehicle and is moving toward the customer location to deliver the order.

Additionally, after order delivery 232 occurs, the proximity system may determine that the courier has returned to the vehicle when the courier has traveled within a predetermined radius of the vehicle. This may indicate that the courier is ready to be given another order assignment. In various embodiments, other events indicating travel status of the courier to the merchant may be tracked at 425 and 431.

Figure 5:
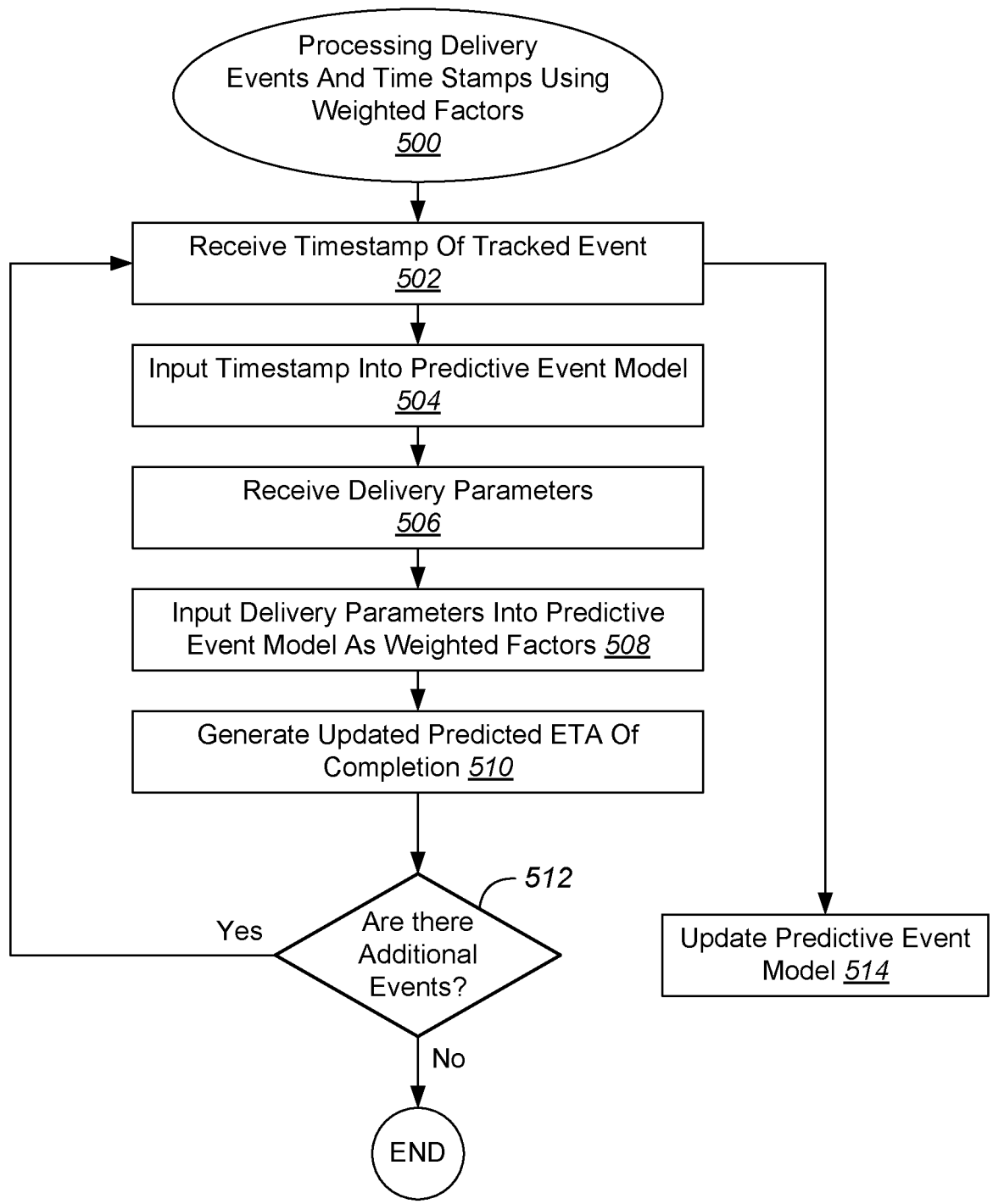
FIG. 5 illustrates a method for dynamic estimated time of arrival predictions, in accordance with one or more embodiments.

FIG. 5 illustrates and example process 500 for processing of delivery events and timestamps using weighted factors, in accordance with one or more embodiments. At 502, a timestamp of an event corresponding to an order is received. In various embodiments, the order may be an order placed by a customer via a customer device. In some embodiments, the event may be any one of events described with reference to FIG. 2, and received as described with reference to FIGS. 4A-4C.

At 504, the timestamp is input into a corresponding predictive event model. In some embodiments, a neural network is implemented to generate an estimated time of arrival (ETA) for a particular order. Such systems may learn (or progressively improve performance) to do tasks by considering examples, generally without task-specific programming, such as generate accurate ETA predictions. In some embodiments, the neural network provides a predictive model to input a timestamp associated with an event and generate predictive ETAs for one or more subsequent delivery events.

In some embodiments, the neural network may comprise a plurality of subnetworks, each of which function as a predictive event model to generate an estimated length of time for a particular interval of time between subsequent delivery events. As used herein, the terms "subnetwork" and "event model" may be used interchangeably, unless otherwise noted. In some embodiments, each interval between events, such as those events illustrated in FIG. 2, may be associated with a subnetwork. In other words, a particular predictive event model may predict a duration between one event to the next, as shown in FIG. 2.

At 506, delivery parameters corresponding to the order are received. Delivery parameters may include various factors or measurements that may affect the length of time between one or more tracked events. In various embodiments, delivery parameters may include time, date, traffic, weather, historical courier performance, and size of markets. Delivery parameters may further include the number of orders received, the number of items in an order, the type of dishes in an order, the sub-total of an order, the historical restaurant data. In various embodiments, various other parameters may be implemented in the neural network.

At 508, the delivery parameters are input into the corresponding predictive event model as weighted factors. In various embodiments, the neural network may be trained to correlate the various parameters with particular effects on time durations between successive events. The neural network may assign weights to such parameters creating weighted factors. Such weights may be adjusted based on actual time of arrivals.

For example, certain dates may fall on holidays that are historically known to be busy days. Thus, certain holidays may be correlated with increased traffic or increased number of orders placed. Additionally, certain times of the day may be associated with heavier traffic, such as during rush hours.

In some embodiments, the time of day is a parameter that is continuously updated in real-time and input into the neural network.

In some embodiments, traffic information may be tracked in real-time. In some embodiments, traffic information may be tracked by a third party application. In some embodiments, traffic data is updated in real-time, or constantly updated in near real-time.

Parameters corresponding to weather may also inform traffic or order impact. For example, inclement weather may correlate with heavier traffic due to hazardous conditions. Inclement weather may also correlate with more orders placed since customers may be more likely to stay indoors. Weather parameters may also correspond to change in demands for particular food types. For example, more ice cream may be ordered during hot days.

In some embodiments, the size of markets may correspond to the number of individuals in a certain market who are potential customers, couriers, and/or merchants of a product or service. As used herein, the term market may be used to mean either a particular merchant, or a group of merchants associated with a particular product type. However, in some embodiments, the term market may refer to the total customers, couriers, and/or merchants in a given area that is part of the logistics platform. The neural network may identify particular market sizes as correlated with certain differences in times for order preparation or delivery. The size of markets may also correspond to new and more mature markets. For example, a newer market may be correlated with longer order preparation times, while more mature markets may be correlated with faster order preparation times.

Another input parameter may include fleet load factor, which corresponds to the ratio of number of orders outstanding to the number of couriers outstanding. In some embodiments, the higher this ratio of fleet load factors may correspond to an insufficient amount of couriers, and thus longer time durations for events after order ready 218.

In some embodiments, the item types in an order may be input as parameters. For example, certain dishes may be correlated with particular preparation times. In some embodiments, the size of an order may be input as predictive parameters. In some embodiments, more items within an order may correlate to longer preparation times. In some embodiments, the sub-total price of an order may also correspond to order size or order preparation time. For example, a larger sub-total may correlate to a larger amount of items within the order. Additionally, more expensive items may take longer to make, due to more ingredients, more difficulty, or more specialization in preparation.

In some embodiments, the neural network may determine the average rate for time durations between one or more events on a courier timeline 210 for couriers in a given predetermined area. Similarly, in some embodiments, the neural network may determine the average rate for time durations between one or more events on a merchant timeline 210 for a particular merchant. However, historical performance may also be input as parameters.

The historical performance of a courier may be a record of the previous time durations between one or more events on courier timeline 211 for a particular courier. This record may be compared to the average time durations between one or more events on courier timeline 211 for all couriers within a given area. The neural network may use this factor to assign a particular state variable to a given courier to adjust predictions accordingly. For example, a given courier may have shorter time durations between particular events, such as between parked at merchant 224 and arrival at merchant 226, as compared to the average for a given area. The neural network may adjust the ETA prediction for arrival at merchant 226 accordingly for this particular courier.

The historical performance of a particular merchant may also be input. This may include the average time duration between events on merchant timeline 210 for that particular merchant. The neural network may use this factor to assign a particular state variable to a given merchant to adjust predictions accordingly. For example, the average time for a particular merchant to prepare a particular item may be tracked and determined. As an example, some merchants may not transmit a confirmation of receipt of order, such as at step 411, but instead immediately begin preparation of the order. Once the order has been complete, the merchant may then transmit the confirmation of receipt of order and confirmation of completion of order simultaneously. The neural network may determine an ETA prediction accordingly such that a delivery routing system may appropriately route a courier at the optimal time.

In some embodiments, historical performance parameters may be organized into aggregate units for a predetermined amount of time. For example, the historical performance of a courier or merchant for the previous thirty (30) day increment is given higher weighted values. In some embodiments, the historical performance parameters for days occurring before the previous thirty (30) days are also input with lower weighted values. In some embodiments, the historical performance parameters for days occurring before the previous thirty (30) days may be discarded.

In various embodiments, weights assigned to particular parameters may be updated based on other parameters. For example, the weight given to traffic may be adjusted in real-time as the time changes from peak rush hour to after rush hour. In some embodiments, one or more parameters may cause the neural network to maintain a particular state variable.

At 510, an updated predicted estimated time of arrival (ETA) is generated. The parameters and timestamp are input into various computational layers of the subnetwork. In some embodiments, such computational layers may include, but are not limited to, linear layers, convolution layers, deconvolution layers, residual layers, quadratic layers, etc. In some embodiments, the timestamp of an event, or actual time of arrival (ATA) for the event, is input into one or more computational layers of a predictive model to output a predicted ETA for the delivery of the order, such as order delivery 232.

In other embodiments, the ATA of an event is input into one or more computational layers to output a predicted ETA for a subsequent delivery event. Then, the output predicted ETA is input into additional computational layers of another predictive model to determine additional predicted ETAs for additional delivery events. In some embodiments, each computational layer in a subnetwork may correspond to one or more parameters.

In some embodiments, a predicted ETA may be generated for each event on timelines 210 and 211. In some embodiments, the predicted ETAs for one or more events may be transmitted to various client devices, such as customer devices, merchant devices, and courier devices. The predicted ETAs may further be used for delivery routing system for assignment of orders to couriers and merchants for delivery.

This approach divides the delivery process into distinct delivery events that are more predictable because they depend on unique features of the merchant, such as order protocol, food preparation speed, etc. Furthermore, the disclosed system provides increased capability of receiving the timestamp data for each delivery event through various applications and devices. Thus, there is a natural way to incorporate real-time updates to ETA predictions based on events that take place during a delivery.

At 512, it is determined whether additional events exist for the delivery. If an ATA for the final event, such as order delivery 232, has been received, then process 500 ends. However, if additional events exist, then process 500 returns to operation 502 to receive the timestamp of a subsequent event. The timestamp of the subsequent event may be used by the neural network to train itself by comparing the timestamp of the subsequent event with the predicted ETA at 514.

At 514, a corresponding event model is updated. In some embodiments, the processor dynamically generates the plurality of ETA time durations by continuously training a predictive event model using the plurality of weighted factors. In various embodiments, the weights may also be adjusted based on timestamps corresponding to ATAs of various delivery event updates that are received as described in FIGS. 4A-4C. When an event update is received, the neural network may compare the ATA with the predicted ETA for a particular event and analyze and differences. Based on the comparison, the neural network may update weights given to particular parameters to account for any differences between the predicted ETA and the received ATA for an event. As such, the predictive models in the neural network of the dynamic ETA prediction system are continuously being trained during operation.

Figure 6:
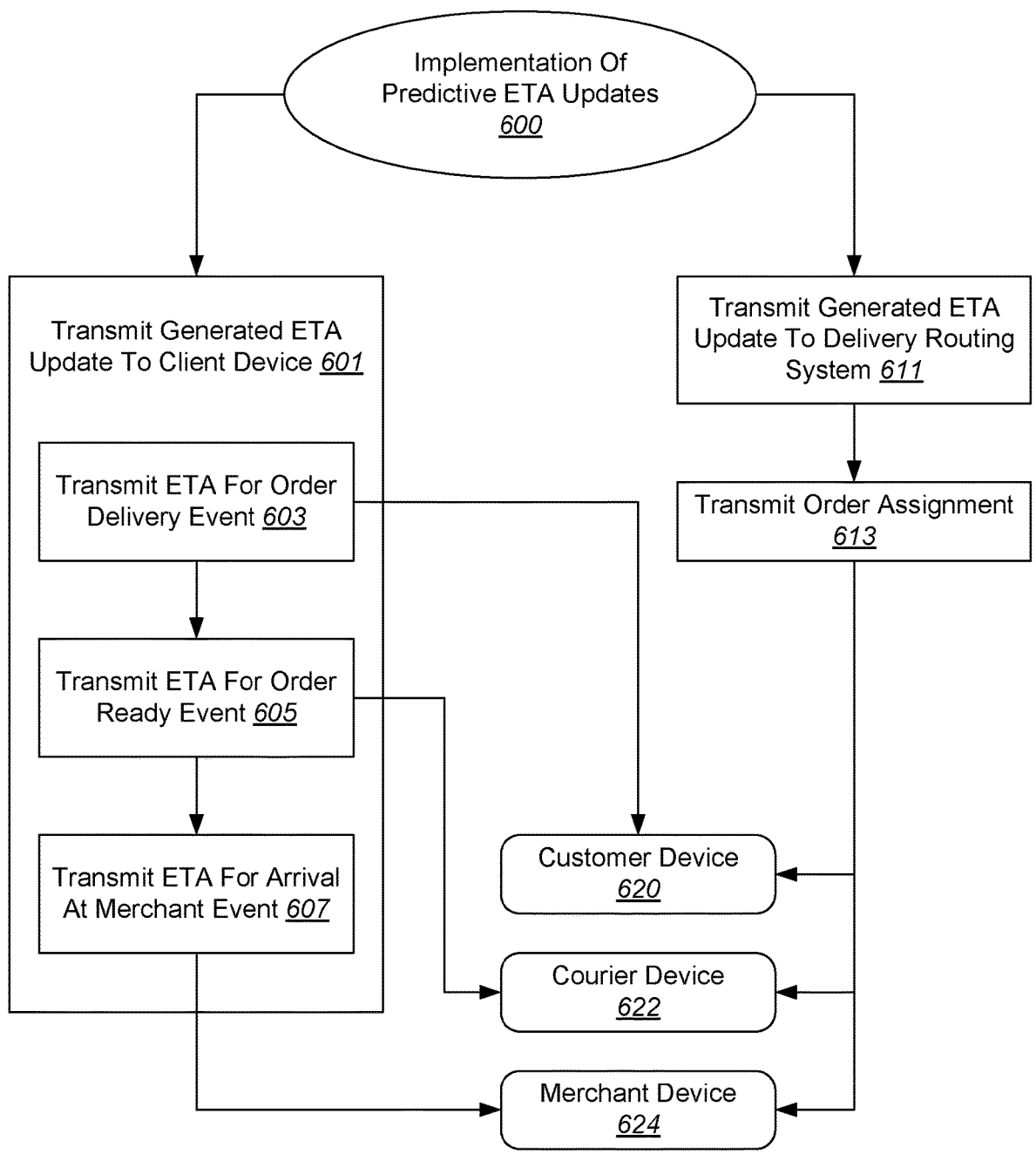
FIG. 6 illustrates an example flow process for implementation of predictive ETA updates, in accordance with one or more embodiments.

FIG. 6 illustrates an example flow process 600 for implementation of predictive ETA updates, in accordance with one or more embodiments. As previously described, the described systems may generate predictive ETA updates for one or more delivery events, including completion of the order by the restaurant, pickup of the order by the courier, and completion of delivery of perishable goods to the customer. Such predictive ETA updates may be transmitted to various client devices at 601. As shown in FIG. 6, such client devices include customer device 620, courier device 622, and merchant device 624. Client devices 620, 622, and 624 may be any one of client devices 302-308, as shown in FIG. 3.

For example, at step 603, a predicted ETA for order delivery 232 may be provided to the customer device 620. As another example, at step 605, the predicted ETA for order ready 218 may be provided to the courier device 624 to notify the courier that it is ready for pickup. As a further example, at 607, the predicted ETA for arrival at merchant 226 may be provided to the merchant device 624 to notify the merchant when to expect a courier to arrive. One or more predicted ETA updates for various other events may be transmitted to any one of client devices 620, 622, and 624.

The disclosed systems may also provide a delivery routing system with timestamps necessary to make informed decisions on when deliveries should be assigned to a courier. In some embodiments, the predicted ETA updates are transmitted to a delivery routing system at step 611. Such delivery routing system may input the ETA updates into an assignment algorithm to assign couriers to a plurality of received orders. In some embodiments, the delivery routing system may assign subsequent orders to a courier based on the predicted ETAs for various events. For example, a subsequent order may be assigned to a courier that is currently en route to a customer location based on the predicted ETA for the order delivery 232. In some embodiments, the assignment of a subsequent order may also depend on the predicted ETA of the order ready event 218 of the subsequent order, as well as distance and travel time parameters of the courier to the merchant corresponding to the subsequent order.

In various embodiments, at step 613, the order assignment may be transmitted to a customer device 620 to notify the customer of information corresponding to the courier, such as identification, contact information, etc. In some embodiments, the order assignment may be transmitted to the courier device 622 to notify the courier of information corresponding to the merchant and/or customer, such as location, contact information, order information, etc. In some embodiments, the order assignment may be transmitted to the merchant device 624 to notify the merchant of information corresponding to the customer and/or courier, including contact information.

In some embodiments, the delivery routing system may assign multiple orders to the same courier. For example, multiple orders being delivered to customer locations that are within a predetermined distance may be assigned to the same courier to optimize a travel route for delivery. In some embodiments, the predicted ETAs for order ready events 218 of such multiple orders may be input to determine whether a single courier should be routed to pick up the multiple orders.

Additionally, it provides a method for pinpoint issues to determine which part of a delivery went wrong by comparing predicted and actual event timestamps. In some embodiments, the plurality of ETA time durations may be used to escalate issues and determine which part of a delivery went wrong by comparing predicted and actual event timestamps. For example, any large discrepancies between predicted ETAs and ATAs for events in a delivery may be identified to pinpoint where delays occurred amongst the delivery events, as well as identify major causes for delays. For example, for a particular delivery, the greatest discrepancy between predicted ETA and ATA may be identified for the parked at merchant event 224. If multiple instances of such discrepancy occur for multiple couriers, the cause may be identified as a lack of parking areas near such merchant. Once identified, this issue may be appropriately addressed to further optimize deliveries.

Figure 7A:
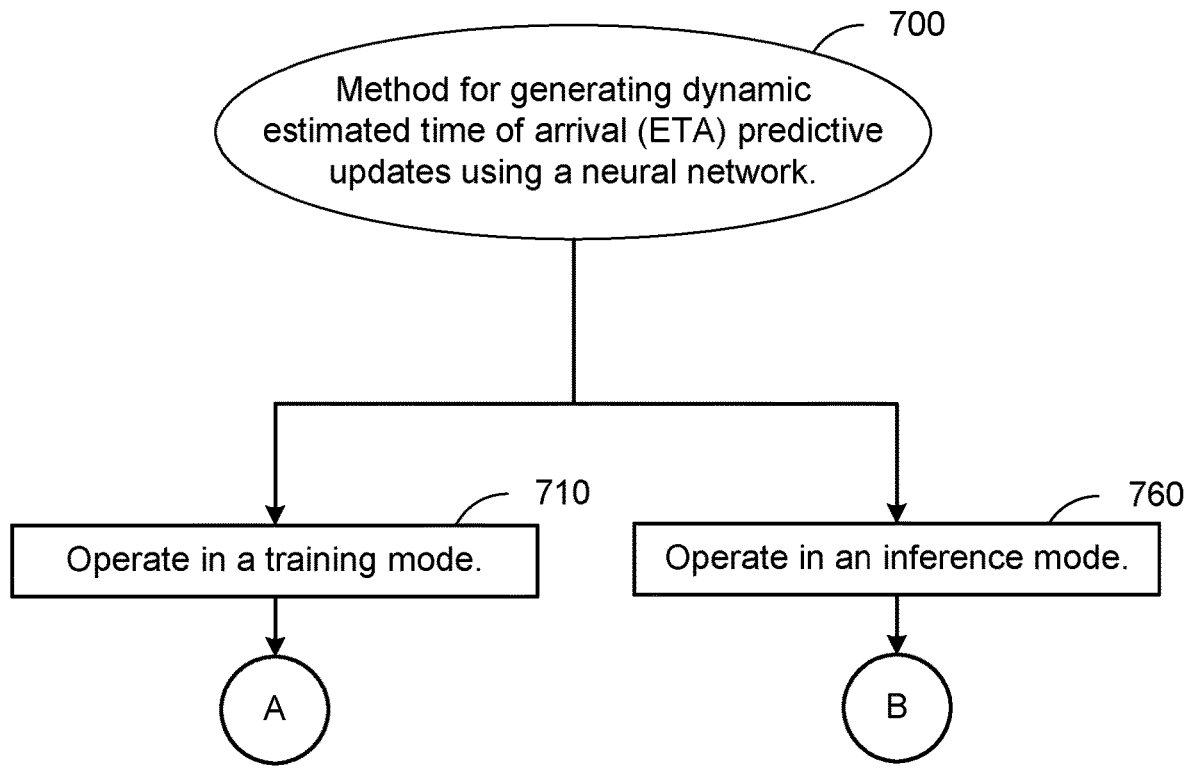
FIGS. 7A-7B illustrate an example method for generating dynamic estimated time of arrival (ETA) predictive updates using a neural network, in accordance with one or more embodiments.
Figure 7B:
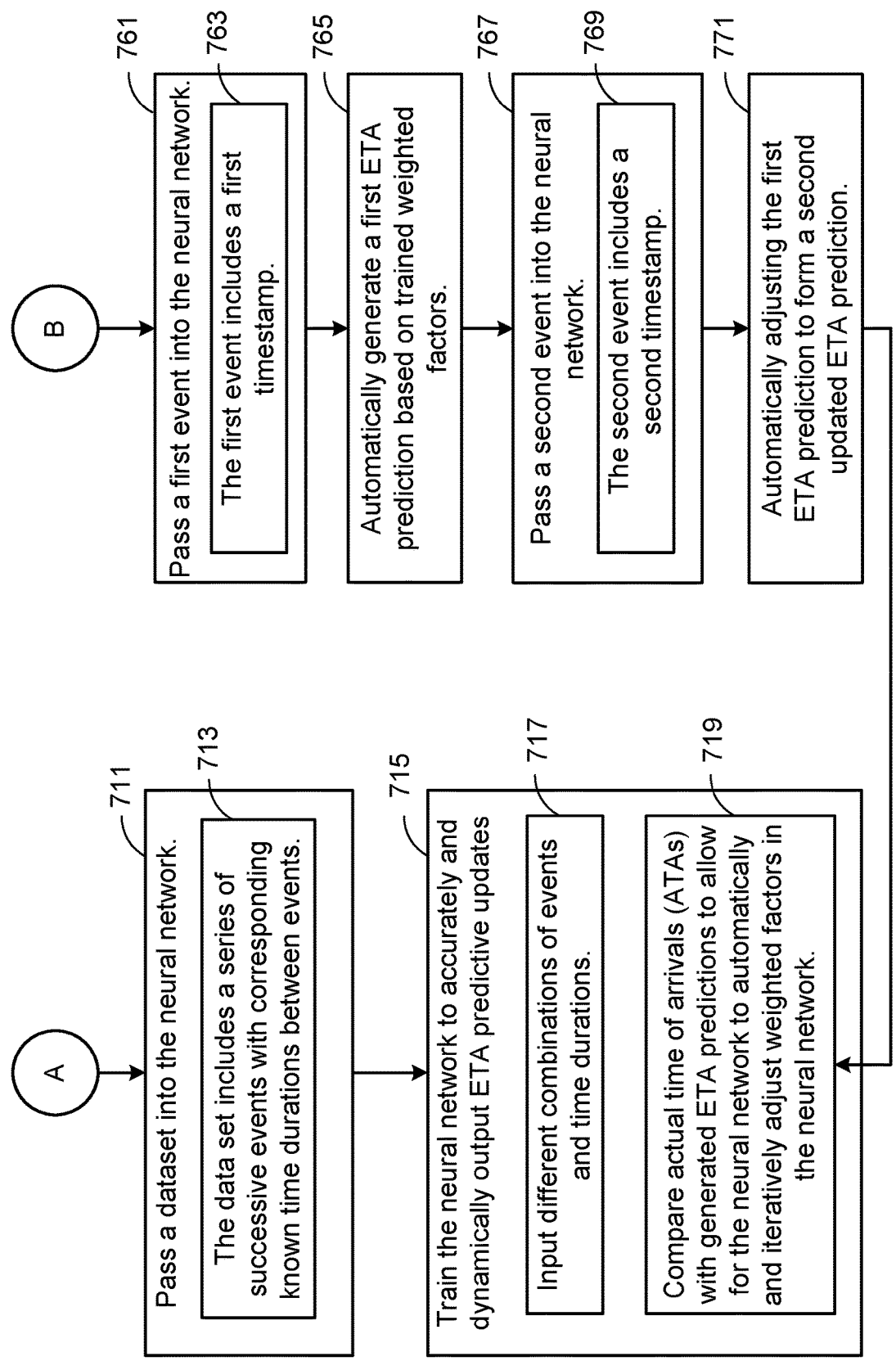

With reference to FIGS. 7A-7B, shown an example method 700 for generating dynamic estimated time of arrival (ETA) predictive updates using a neural network, in accordance with one or more embodiments. In certain embodiments, the neural network a neural network within a predictive ETA system. The neural network may comprise one or more computational layers.

FIG. 7B illustrates an example of operations of the neural network in the training mode 710 and inference mode 760, in accordance with one or more embodiments. When operating in the training mode 710, a dataset 713 is passed into the neural network at operation 711. In some embodiments, the dataset 713 includes a series of successive events with corresponding known time durations between events. In some embodiments, the successive events in the dataset 713 may be referred to as training events. In some embodiments, the successive events may include one or more of the events described with reference to FIG. 2. For example, a first training event of the successive events includes a placement of the order at a merchant by a customer, a second training event of the successive events includes confirmation of receipt of the order by the merchant, a third training event of the successive events includes confirmation of completion of the order by the merchant, a fourth training event of the successive events includes pickup of the order by a courier, and a fifth training event of the successive events includes completion of delivery of the order to the customer.

Data sets 713 may also include various parameters corresponding to the combinations of events and time durations. In some embodiments, the parameters may correspond to factors that correlate with the time durations. In various embodiments, the parameters may include one or more parameters as described with reference to FIG. 5. Such factors may be weighted. In some embodiments, the factors are weighted based on predetermined or known data.

At operation 715, the neural network is trained to accurately and dynamically output ETA predictive updates. In some embodiments, training the neural network includes inputting (717) different combinations of events and time durations. In some embodiments, the neural network is not provided with the known time durations. The neural network may generate ETA predictions for subsequent events based on the input events and parameters. In some embodiments, actual time of arrivals (ATAs) for the subsequent events are then provided. In some embodiments, training the neural network further includes comparing (719) actual time of arrivals with generated ETA predictions to allow for the neural network to automatically and iteratively adjust weighted factors in the neural network.

In some embodiments, the neural network may be determined to be sufficiently trained once a predetermined number of training data sets have been run through the neural network. In other embodiments, the neural network may be determined to be sufficiently trained when the difference between a number of ETA predictions and corresponding ATAs fall within a predetermined threshold. For example, a neural network may be sufficiently trained when 90% of output ETA predictions fall within a 2 minute range of the known corresponding ATA.

When operating in the inference mode 760, a first event 763 is passed into the neural network at operation 761. The first event 763 may include a first timestamp. The first event 763 may be any one of various events previously described with reference to FIG. 2. The first timestamp may correspond to a first ATA for the first event 763. Once input into the various computational layers of the neural network, a first ETA prediction is automatically generated based on trained weighted factors at operation 765. In some embodiments, the first ETA prediction may correspond to the estimated time that the delivery will be delivered, such as at order delivery 232. In other embodiments, the first ETA prediction may correspond to the estimated time that a subsequent delivery event will occur, such as a second event described below.

Next, a second event 769 is passed into the neural network at operation 767. The second event 769 may include a second timestamp. The second event 767 may be any one of various events previously described with reference to FIG. 2. For example, the second event 767 may be the subsequent delivery event to the first event 763. The second timestamp may correspond to a second ATA for the second event. Once input into the various computational layers of the neural network, the first ETA prediction is automatically adjusted to form a second updated ETA prediction at operation 771.

In some embodiments, the neural network comprises of plurality of sub-networks. Each sub-network may correspond to a time duration between the successive events. For example, a first sub-network may correspond to a time duration between the first event and the second event, a second sub-network may correspond to a time duration between the second event and a third event, and so on. In some embodiments, the output of the first sub-network may be input into the second subnetwork to generate an ETA prediction for the third event and/or order delivery. In other embodiments, the output of each sub-network is aggregated to adjust the ETA prediction to form the second updated ETA prediction.

In some embodiments, the ATA for the second event may be compared to the first ETA prediction generated to allow for the neural network to automatically and iteratively adjust weighted factors in the neural network, such as at operation 719. In some embodiments, the ATA for the second event may be input into the first sub-network to automatically and iteratively adjust weighted factors in the first sub-network.

Figure 8:
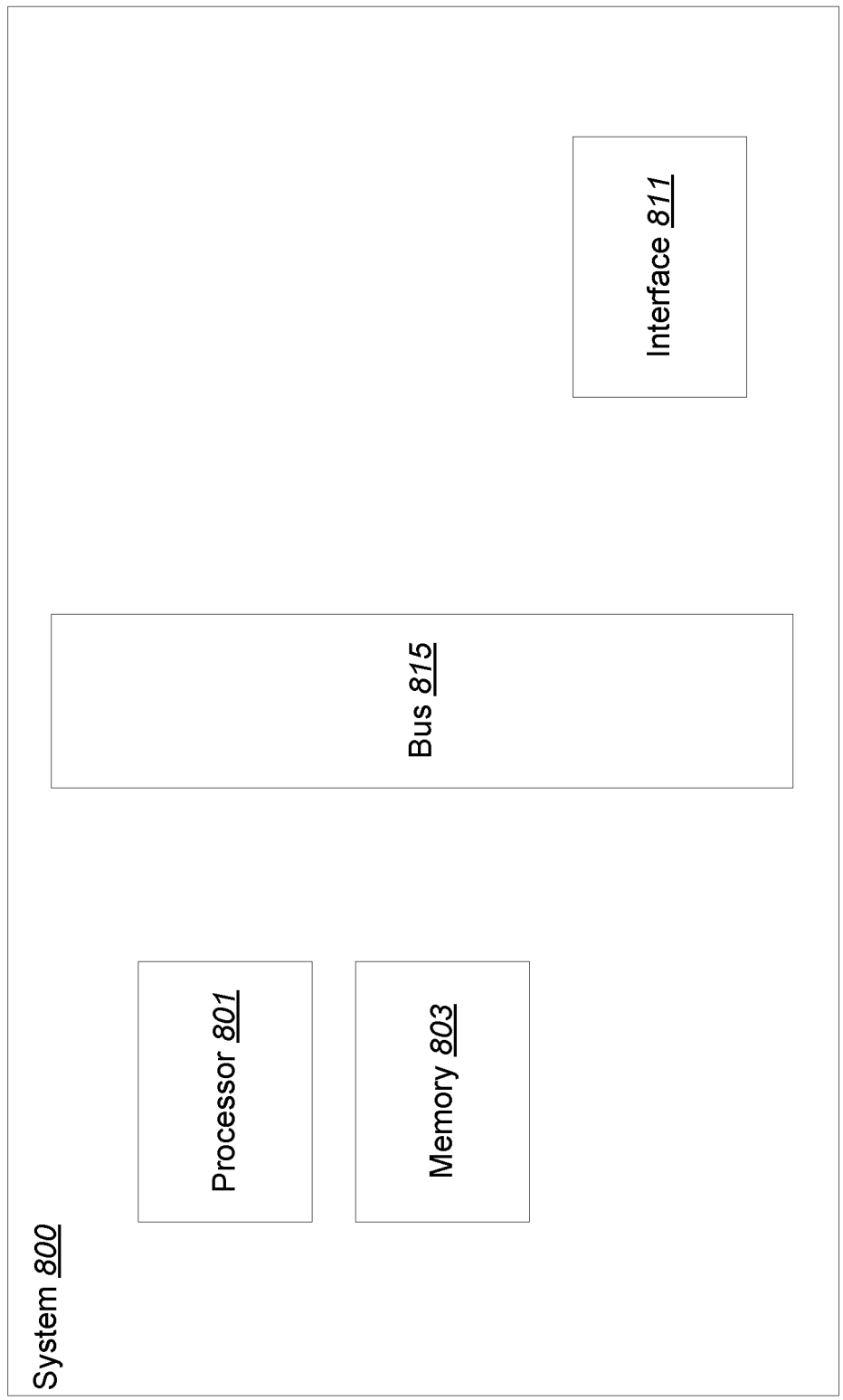
FIG. 8 illustrates a particular example of a computer system that can be used with various embodiments of the present disclosure.

Various computing devices can implement the methods described. For instance, a mobile device, computer system, etc. can be used to generate dynamic ETA predictive updates. With reference to FIG. 8, shown is a particular example of a computer system 800 that can be used to implement particular examples of the present disclosure. According to particular example embodiments, a system 800 suitable for implementing particular embodiments of the present disclosure includes a processor 801, a memory 803, an interface 811, and a bus 815 (e.g., a PCI bus). When acting under the control of appropriate software or firmware, the processor 801 is responsible for processing inputs through various computational layers and algorithms in a neural network. In some embodiments, the processor is responsible for updating the parameters of each computational layer using algorithms, including but not limited to, a stochastic gradient descent algorithm and a back propagation algorithm. Various specially configured devices can also be used in place of a processor 801 or in addition to processor 801. The complete implementation can also be done in custom hardware.

The interface 811 is typically configured to send and receive data packets or data segments over a network. Particular examples of interfaces the device supports include Ethernet interfaces, frame relay interfaces, cable interfaces, DSL interfaces, token ring interfaces, and the like. The interface 811 may include separate input and output interfaces, or may be a unified interface supporting both operations. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 800 uses memory 803 to store data and program instructions for operations including training a neural network and generating ETA predictions, such as method 700. The program instructions may control the operation of an operating system and/or one or more applications, for example. The memory or memories may also be configured to store received metadata and batch requested metadata. The memory or memories may also be configured to store data corresponding to parameters and weighted factors.

Because such information and program instructions may be employed to implement the systems/methods described herein, the present disclosure relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the disclosure. It is therefore intended that the disclosure be interpreted to include all variations and equivalents that fall within the true spirit and scope of the present disclosure.

What is claimed is:

1. A server configured to generate dynamic estimated time of arrival (ETA) predictive updates for real-time delivery of perishable goods, the server comprising:
   an interface configured to receive a plurality of confirmation messages from one or more user devices, the confirmation messages corresponding to a series of events for an order, wherein the plurality of confirmation messages correspond to at least a first event of the series of events with a first timestamp;
   memory configured to store the confirmation messages, and a training dataset including a series of successive training events with corresponding known time durations between training events; and
   a processor configured to:
      train a neural network using the training dataset to dynamically output ETA predictive updates, wherein the neural network includes a plurality of subnetworks, each subnetwork corresponding to a duration between two successive events of the series of events, wherein training the neural network includes inputting different combinations of training events and comparing generated ETA predictions with known time durations to automatically and iteratively adjust weighted factors in the neural network, and
      input the first event and the first timestamp into the neural network to automatically generate a first ETA prediction using the weighted factors, the first ETA prediction corresponding to the duration for a final event of the series of events, wherein an output of each subnetwork is aggregated to output the first ETA prediction.

2. The server of claim 1,
   wherein the interface is further configured to receive a confirmation message corresponding to a second event of the series of events with a second timestamp; and
   wherein the processor is further configured to input the second event and the second timestamp into the neural network to update the first ETA prediction with a first updated ETA prediction.

3. The server of claim 1, wherein the weighted factors include time, date, and weather.

4. The server of claim 1, wherein the weighted factors include a sub-total of the order and a number of pending orders at an associated merchant.

5. The server of claim 1, wherein the one or more user devices include a customer device, a courier device, and a merchant device.

6. The server of claim 5, wherein the ETA predictions are provided to the customer device of the one or more user devices.

7. The server of claim 5, wherein the ETA predictions are provided to the courier device and used to pair delivery opportunities with a courier corresponding to the courier device.

8. The server of claim 1,
wherein the first event corresponds to a placement of the order from a merchant by a customer;
wherein a second event of the series of events corresponds to a confirmation of completion of the order by the merchant; and
wherein a third event of the series of events corresponds to a pickup of the order from the merchant by a courier or a delivery of the order to the customer.

9. The server of claim 1, wherein the ETA predictions are provided to an assignment algorithm used to pair couriers with a plurality of received orders.

10. The server of claim 1, wherein the ETA predictions are provided to escalate issues and determine which part of a delivery went wrong by comparing predicted and actual event timestamps.

11. The server of claim 1, wherein the processor continuously adjusts the weighted factors in the neural network using timestamps associated with received confirmation messages as known time durations for corresponding events.

12. A programmable device configured for generating dynamic estimated time of arrival (ETA) predictive updates for a series of events for an order, wherein the programmable device is configured for:
obtaining a training data set including a series of successive training events with corresponding known time durations between training events;
training a neural network to dynamically output ETA predictive updates, wherein the neural network includes a plurality of subnetworks, each subnetwork corresponding to a duration between two successive events of the series of events, wherein training the neural network includes inputting different combinations of training events and comparing generated ETA predictions with known time durations to automatically and iteratively adjust weighted factors in the neural network;
receiving a first confirmation message from one or more user devices, the first confirmation message corresponding to a first event of the series of events, wherein the first confirmation message includes a first timestamp; and
inputting the first event and the first timestamp into the neural network to automatically generate a first ETA prediction using the weighted factors, the first ETA prediction corresponding to the duration for a final event of the series of events, wherein an output of each subnetwork is aggregated to output the first ETA prediction.

13. The programmable device of claim 12, wherein
the first event corresponds to a placement of the order at a merchant by a customer,
a second event of the series of events corresponds to a completion of the order by the merchant, and
a third event of the series of events corresponds to a pickup of the order from the merchant by a courier or a delivery of the order to the customer.

14. The programmable device of claim 12, wherein the weighted factors include a combination of one or more of the following: time, date, weather, number of dishes in a restaurant order, sub-total of a restaurant order, historical restaurant data, historical courier performance, and size of markets.

15. The programmable device of claim 13,
wherein a first subnetwork corresponds to the duration between the first event and the second event; and
wherein a second subnetwork corresponds to the duration between the second event and the third event.

16. The programmable device of claim 12, wherein the programmable device is further configured for:
receiving a second confirmation message from the one or more user devices, the second confirmation message corresponding to a second event of the series of events, wherein the second confirmation message includes a second timestamp, and
inputting the second event and the second timestamp into the neural network to update the first ETA prediction with a first updated ETA prediction.

17. The programmable device of claim 12, wherein the one or more user devices include a customer device, a courier device, and a merchant device.

18. The programmable device of claim 16, wherein the second timestamp is used as a first known time duration for the neural network to automatically and iteratively adjust the weighted factors in the neural network.

19. A method for generating dynamic estimated time of arrival (ETA) predictive updates for a series of events for an order, the method comprising:
obtaining a training data set including a series of successive training events with corresponding known time durations between training events;
training a neural network to accurately and dynamically output ETA predictive updates, wherein the neural network includes a plurality of subnetworks, each subnetwork corresponding to a duration between two successive events of the series of events, wherein training the neural network includes inputting different combinations of training events and comparing generated ETA predictions with known time durations to automatically and iteratively adjust weighted factors in the neural network;
receiving a first confirmation message from one or more user devices, the first confirmation message corresponding to a first event of the series of events for the order, wherein the first confirmation message includes a first timestamp; and
inputting the first event and the first timestamp into the neural network to automatically generate a first ETA prediction using the weighted factors, the first ETA prediction corresponding to the duration for a final event of the series of events, wherein an output of each subnetwork is aggregated to output the first ETA prediction.

20. The method of claim 19, further comprising:
receiving a second confirmation message from the one or more user devices, the second confirmation message corresponding to a second event of the series of events for the order, wherein the second confirmation message includes a second timestamp; and inputting the second event and the second timestamp into the neural network to update the first ETA prediction with a first updated ETA prediction.

\* \* \* \* \*